Oct. 17, 1967   H. SHIEBER   3,347,465
PRESTRESSED REFRACTORY STRUCTURE
Filed Nov. 5, 1964   2 Sheets-Sheet 1

Herbert Shieber,
INVENTOR.
BY
E. Hayward Marshall
AGENT.

Oct. 17, 1967 H. SHIEBER 3,347,465
PRESTRESSED REFRACTORY STRUCTURE
Filed Nov. 5, 1964 2 Sheets-Sheet 2

Herbert Shieber,
INVENTOR.
BY.
E. Hayward Marshall
AGENT.

United States Patent Office 3,347,465
Patented Oct. 17, 1967

3,347,465
PRESTRESSED REFRACTORY STRUCTURE
Herbert Shieber, Beverly Hills, Calif., assignor, by mesne assignments, to the United States of America as represented by the Administrator of the National Aeronautics and Space Administration
Filed Nov. 5, 1964, Ser. No. 409,126
2 Claims. (Cl. 239—265.11)

This invention relates to a prestressed refractory structure and more particularly to a prestressed ceramic rocket nozzle or other similar refractory structural configuration that must withstand severe thermal and mechanical stresses and deformations and also exhibit great resistance to corrosive gases or liquids or an oxidizing atmosphere at extremely high temperatures over a long period of time.

Many different approaches have been tried in the construction of rocket nozzles to provide a structural configuration that will withstand thermal and mechanical stresses and deformations, and the corrosion of gases in a multiple start, long duration, rocket nozzle application. Among these approaches are those using ablative materials to form the combustion chamber and throat, the ablative material being gradually ablated away, and others using various refractory metals, ceramic oxides, and carbides which have high melting points. However, these materials are either subject to excessive corrosion and oxidation or else have very poor thermal shock resistance, due to low thermal conductivity and/or low tensile strength, as well as a high thermal expansion and a high elastic modulus. Recent efforts to combine refractory oxides with graphite have improved the thermal shock resistance, but have reduced the effective oxidation resistance of the oxide constituents.

Some composite materials such as JTA (C, $ZrB_2$ and Si) and boride Z ($ZrB_2$ and $MoSi_2$) form protective ceramic coatings in oxidizing environments, and the graphite addition to these materials increases the thermal conductivity and provides ductility. However, these materials have only been partially successful in overcoming the problems associated with the construction and operation of rocket nozzles and other structural configurations which are subjected to the severe thermal and mechanical stresses, simultaneously with a corrosive and oxidizing environment.

While various types of prestressing have been commonly utilized in different kinds of concrete structures, these structures are not subjected to the rapidly varying extreme range of temperatures and the differential thermal expansion of rocket nozzles, nor are they exposed to a high temperature corrosive or oxidizing environment. Therefor the conventional prestressed concrete structure would not be applicable to rocket nozzles.

Briefly stated, one preferred embodiment of the prestressed ceramic nozzle of the present invention consists essentially of one or more ceramic inner rings and a refractory metal outer ring around each of the inner rings with an interference fit between the rings creating a prestressed condition, wherein the brittle materials forming the inner ring are never allowed to be loaded in tension. The outer ring of refractory metal is normally stressed in tension, but is not subjected to contact with the high velocity and extremely hot, oxidizing and corrosive gases.

While the term "ceramic" as commonly used does not clearly define any specific group of materials, in the does not clearly define any specific group of materials, in the present application it will be used to include any refractory materials, which are brittle and have low tensile strength but have high melting points and thermal stability in a corrosive environment, such as a rocket nozzle. These ceramic materials include metallic oxide, carbides, borides, nitrides, and other metallic compounds having similar characteristics.

While the present invention contemplates the prestressing of the refractory ceramic oxide or other brittle material in compression and the refractory metal in tension by an initial mechanical interference fit during assembly at ambient temperatures, the terms prestressed or prestressing, as utilized in the present application, also include the interference fit or stresses produced by the differential thermal expansion of the inner and outer rings, since many of the refractory ceramic oxides and similar materials will have a higher coefficient of thermal expansion than the refractory metals. Therefore even though the initial fit between the inner and outer ring at ambient temperature may be merely a snug or loose fit, the outer refractory metal ring will be subjected to tensile load and the refractory ceramic oxide will be placed in compression, after the materials have been heated to their operating temperatures, and before the ceramic ring has been subjected to any high tensile stresses which might induce cracking or other modes of failure.

It will also be apparent that the temperature will vary between the inner surface of the ceramic oxide ring which is subjected directly to the hot gases and the outer surfaces of the refractory metal ring. Furthermore, the thermal expansion characteristics and the elastic moduli of the ceramic oxide ring and the refractory metal ring will vary considerably depending on the selection of materials. However, the thermal expansion characteristics of the ceramic oxide ring may be varied considerably by the proper selection and mixing of the different ingredients, and the ductility of the outer ring may be varied by the addition of certain alloying materials.

Specific examples of refractory metals which may be employed for the reinforcing outer rings are molybdenum, columbium, tantalum, tungsten, and other similar metals which will maintain relatively high tensile strength at extremely high temperatures, or their alloys. Ceramic oxides suitable for use in the inner rings are beryllia, (BeO) or zirconia ($ZrO_2$), preferably blended with silica ($SiO_2$) in such proportions that the thermal expansion of the ceramic oxide will be approximately equal to or less than that of the refractory metal ring, so that excessive stresses are not developed during thermal expansion at relatively high temperatures and with extreme temperature gradients. Another material which may be utilized for the inner ceramic ring is JTA, a product of the Union Carbide Corporation, which is composed of carbon, zirconium, boron and silicon.

One object of the present invention is to provide a composite structural configuration of refractory materials that will withstand severe thermal and mechanical stresses and deformations, as well as corrosive gases and an oxidizing environment.

Another object of the present invention is to provide an improved rocket nozzle with prestressed inner rings of refractory ceramic material having an interference fit with an outer ring formed of refractory metal, wherein the inner ring is stressed in compression and the outer ring is stressed in tension throughout most of the temperature range of operation.

A further object of the present invention is to provide an improved rocket nozzle utilizing a liner formed by a plurality of prestressed ceramic rings which can be readily sealed in size by increasing the overall diameter of the rings, but using the same cross-sectional dimensions and materials.

Other objects and many of the attendant advantages of this invention will be readily appreciated as the same becomes better understood when considered in connection with the accompany drawings wherein.

Figure 2:
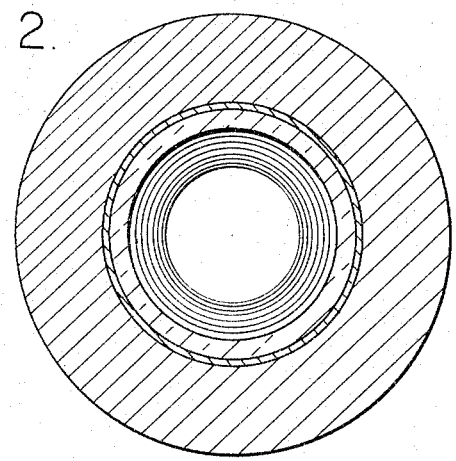
FIGURE 2 is a cross-sectional view taken on the line 2—2 of FIGURE 1.
Figure 1:
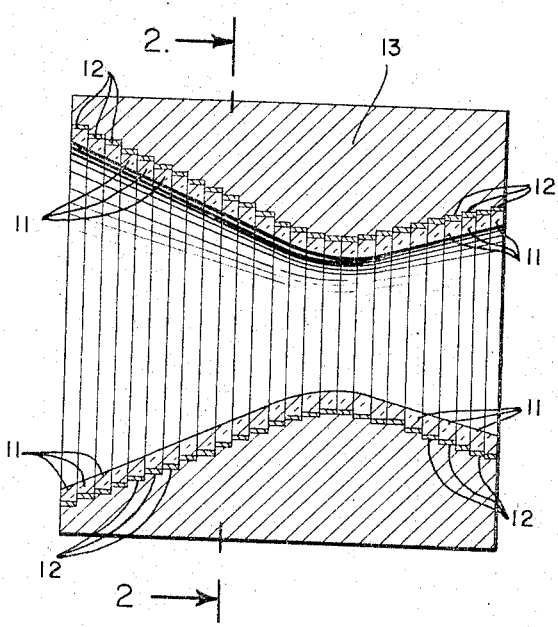
FIGURE 1 is a longitudinal sectional view of one preferred embodiment of the present invention utilizing a plurality of prestressed rings throughout the length of the rocket nozzle, with the rings supported by a molded ablative cylinder for retaining the rings in alignment.

Referring now to the drawings in detail and more particularly to FIGURES 1 and 2, one preferred one preferred embodiment of the present invention is illustrated, wherein a plurality of annular rings 11 are formed of a suitable refractory ceramic material, such as a mixture of ceramic oxides, with a plurality of metal outer rings 12 which are initially stressed in tension with respect to the inner rings 11 which are maintained in compression.

The enter assembly or stack of rings 11 and 12 are held in position by an outer cylinder 13, which may be molded of some suitable ablative material, such as a mixture of silicon and phenolic resin, which preferably has a low modulus of elasticity and yields to permit the free expansion of the metal refractory rings 12 and the inner ceramic refractory rings 11 without exerting undue stresses on the rings.

If desired, the outer metal rings 12 and the inner ceramic rings 11 may have a slight taper, that is a frustoconical shape, which will prevent the rings from slipping longitudinally or axially with respect to the outer cylinder 13 due to thermal expansion in a longitudinal axial direction at extremely high temperatures, since the temperature of these rings will be much higher than the temperature of the outer cylinder 13.

The composite rings 11 and 12 might also be held in place by end plates (not shown), however this method might possibly induce undue stresses in compression with the particular structure shown, where the series or stack of rings are utilized throughout the length of the rocket.

Figure 3:
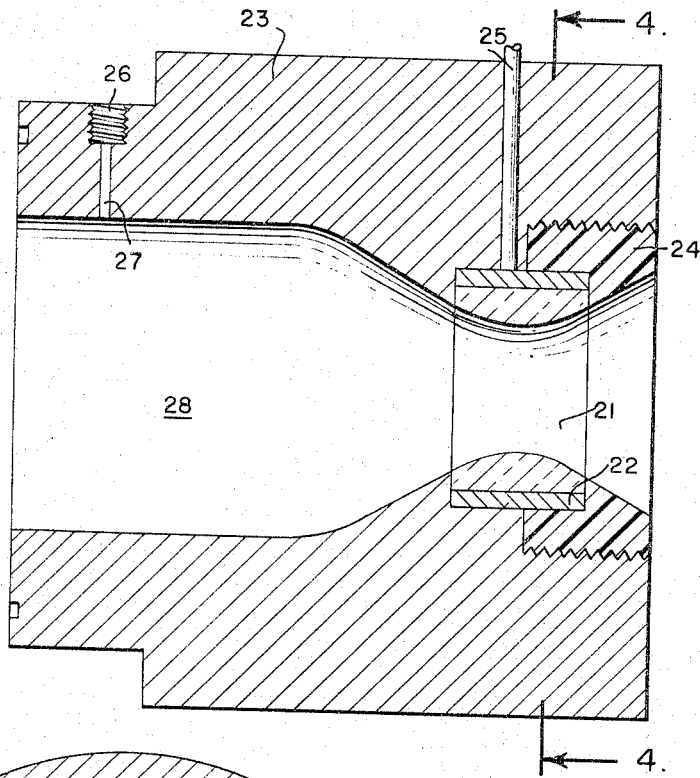
FIGURE 3 is a longitudinal sectional view of one modification of the present invention, wherein a single prestressed ring is utilized at the throat of a rocket nozzle and is held in position by a threaded plug in the end of the molded cylinder.
Figure 4:
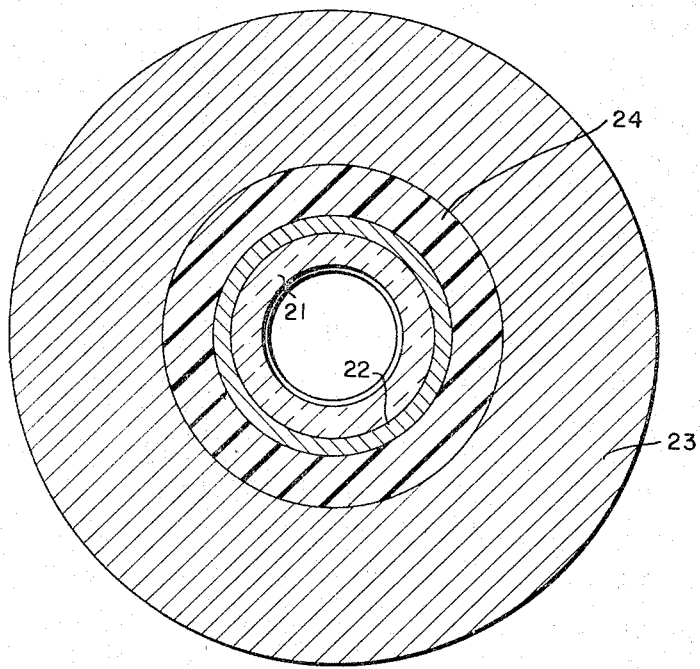
FIGURE 4 is a cross-sectional view taken on the line 4—4 of FIGURE 3.

In the modification illustrated in FIGURES 3 and 4, the single refractory ceramic ring 21 is prestressed by the refractory metal ring 22 and inserted in the throat area of the rocket nozzle 23, which may be formed of any suitable ablative material, such as a mixture of silicon and a phenolic resin.

In this instance, refractory ceramic inner ring 21 is relatively large and contoured to the shape of the throat, and the composite prestressed ring may be retained in the cylindrical body of the rocket nozzle 23 by a threaded plug 24 formed of the same material as the body 23.

If desired, a temperature sensing probe 25 may be provided for contact with the outer metal ring 22 and a threaded opening 26 and bore 27 may be provided for monitoring the temperature of the ring 22 and the pressure within the combustion chamber 28 respectively.

The basic concept of the present invention is the use of mechanical prestressing, either initially or during the thermal expansion at high temperatures, so that the compressive load in the refractory ceramic ring is balanced by the tensile load in the refractory metal outer ring, when no external loads are applied. This insures that the inner rings, which are composed of brittle materials are never allowed to be loaded in tension. When the composite nozzle structure is subjected to external loads, they would normally be resisted by tensile stresses, and the outer metal rings which are preloaded in tension experience an increase in the tensile stress. However, the inner ceramic rings which are preloaded in compression merely experience a reduction in their compressive stress. Thus it is possible to employ for the compressive rings materials which would normally crack under tension.

If it were possible to find ductile materials which could themselves withstand high temperatures in the oxidizing atmospheres of rocket exahust gases, or while in contact with other corrosive fluids, there would be no need for the combination of ductile and brittle materials as disclosed in the present invention. However, the ductile refractory metals which can withstand the high temperatures of the rocket exhaust environment are critically prone to oxidation and corrosion at mildly elevated temperatures. While oxidation resistant coatings for these metals have been developed, the full temperature strength of the refractory metals cannot be utilized because of the far lower melting point of the coatings themselves.

The only materials currently known which can endure an oxidation atmosphere at extremely high temperatures are the ceramic oxides, and possibly some ceramic carbides, borides, or nitrides. These materials however are relatively low in tensile strength and are quite brittle; that is they have no ability to deform plastically to relieve the tensile stresses. Ceramics, therefore, cannot be reliably employed in a rocket nozzle, where they must resist the tensile stresses created by gas pressure and also by the differential thermal expansion.

In order for refractory ceramic oxides and refractory metals to be employed in a composite structure of the present invention, the following conditions as a minimum must prevail:

(1) Refractory ceramics must not be allowed to experience tensile stresses of any sizable magnitude.

(2) Refractory metals must not be subjected to the contact of hot oxidizing gases.

It is quite apparent that the prestressed ceramic rings of the present invention satisfies the above conditions and may be readily fabricated into a rocket nozzle or other structures, as illustrated, utilizing conventional fabrication techniques.

However, the prestressed structure of the present invention could be subject to failure by overstressing of either of the inner or outer rings, due to the differential thermal expansion during exposure to extremely high temperatures. If the thermal expansion of the ceramic refractory material is much greater than that of the refractory metal reinforcing rings during the firing cycle, a new and greater interference fit is experienced, which could in turn intensify the initial preload to the extent that this might overload the metallic reinforcing ring in tension or the ceramc inner ring in compression.

On the other hand, if the thermal expansion of the metal reinforcing ring is greater than that of the ceramic ring, the initial preload is lost and it may be possible for the outer fibers of the ceramic ring to experience tensile stresses.

Therefore, in order to withstand the rapid variation and range of temperature gradients of the rocket firing, the thermal expansion characteristics and the elastic moduli of the ceramic ring and the refractory metal ring must be carefully matched. The thermal expansion characteristics of the ceramic ring may be varied considerably by varying the mixture of ingredients in the ceramic.

Preferably the thermal coefficient of expansion of the ceramic oxide ring should be equal to or less than that of the refractory metal ring, so that the interference fit is not increased to a point sufficient to fail either of the rings at the most critical temperature differentials experienced in the nozzle operation.

One means of lowering the thermal expansion characteristics of a ceramic oxide such as beryllia (BeO) or zirconia ($ZrO_2$) is to blend it with silica ($SiO_2$). For example, beryllia and silica can be blended in such proportions that the thermal expansion of the resulting ceramic oxide is less than that of the refractory metal ring. Zirconia can also be blended with silica in such proportion to form zircon ($ZrO_2$-$SiO_2$) in suitable proportions to make a satisfactory refractory ceramic oxide ring.

Metals which may be employed for the outer reinforcing ring are molybdenum, columbium, tantalum, tungsten, of their alloys. For example, a columbium alloy (FS85) columbium 61.5% tantalum 28%, tungsten 10%, zirconium 0.5% which has a high thermal coefficient of expansion for a refractory metal. This alloy has been used with zircon ($ZrO_2$-$SiO_2$).

Another specific example is an outer ring formed of the columbium alloy FS85 in the composition as specified above, and an inner ring formed of JTA graphite which is composed of carbon, zirconium, boride and silicon with the elements in the following proportions by weight percentages:

| | Percent |
|---|---|
| Carbon | 48 |
| Zirconium | 35 |
| Boron | 8 |
| Silicon | 9 |

Although the prestressed refractory structure of the present invention is particularly adapted and has been illustrated for use in a ceramic rocket nozzle, similar structures utilizing refractory ceramics prestressed or reinforced by means of refractory metals to form a composite stucture which will withstand extremely high temperatures and rapid variation of the temperature gradient in a corrosive or oxidizing atmosphere may also be utilized in conjunction with fuel cells, industrial gas processes, magneto hydrodynamic power generators and plasma generators, as well as in the turbines and exhaust lines of gas turbines, particularly when utilized in automotive vehicles wherein the exhaust gases cannot be released to the atmosphere at extremely high temperatures and must be cooled before they are released.

Obviously, many other modifications and variations of the present invention may be made within the scope of the following claims.

The embodiments of the invention in which an exclusive property or privilege is claimed are defined as follows:

1. A rocket nozzle comprising:
   (A) a cylindrical supporting body internally contoured and lined with a plurality of prestressed ceramic rings to form a rocket nozzle,
   said rings having a frusto-conical shape to limit axial movement in said body;
   (B) said prestressed ring including an inner ring of brittle refractory ceramic material with low tensile strength exposed to high operating temperatures and a corrosive atmosphere,
   said material consisting of a mixture of ceramic oxides having a relatively low coefficient of thermal expansion;
   an outer ring of refractory metallic material with high tensile strength exposed to lower operating temperatures and a noncorrosive atmosphere,
   said metallic material consisting of a refractory metal having a coefficient of thermal expansion substantially equal to or greater than said ceramic material,
   said outer ring surrounding said inner ring with an initial interference fit therebetween such that said outer ring is stressed in tension and said inner ring is stressed in compression throughout the operating temperature range.

2. A rocket nozzle comprising:
   a cylindrical supporting body internally contoured and lined with a plurality of prestressed ceramic rings to form a rocket nozzle,
   said prestressed rings including inner rings of brittle refractory ceramic material with low tensile strength exposed to high operating temperature and a corrosive atmosphere,
   said material consisting of a mixture of ceramic oxide having a relatively low coefficient of thermal expansion,
   a plurality of outer rings of refractory metallic material with high tensile strength exposed to low operating temperatures and a non-corrosive atmosphere,
   said metallic material comprising a refractory metal having a coefficient of thermal expansion substantially equal to or greater than said ceramic material,
   said outer rings surrounding said inner rings with an initial interference fit therebetween such that said outer rings are stressed in tension and said inner rings are stressed in compression throughout the operating temperature ranges.

References Cited
UNITED STATES PATENTS

| | | | |
|---|---|---|---|
| 3,136,036 | 6/1964 | Dobell | 29—157 |
| 3,156,091 | 11/1964 | Kraus | 239—591 |

EVERETT K. KIRBY, *Primary Examiner.*